(12) United States Patent
Lindgren

(10) Patent No.: US 8,615,919 B2
(45) Date of Patent: Dec. 31, 2013

(54) DEEP WATER FISHING ROD AND ELECTRIC REEL

(76) Inventor: Peter B. Lindgren, Pompano Beach, FL (US)

( * ) Notice: Subject to any disclaimer, the term of this patent is extended or adjusted under 35 U.S.C. 154(b) by 83 days.

(21) Appl. No.: 13/440,171

(22) Filed: Apr. 5, 2012

(65) Prior Publication Data
US 2012/0260558 A1    Oct. 18, 2012

Related U.S. Application Data

(63) Continuation of application No. 12/505,099, filed on Jul. 17, 2009, now abandoned, which is a continuation-in-part of application No. 11/355,911, filed on Feb. 16, 2006, now abandoned.

(60) Provisional application No. 60/654,386, filed on Feb. 17, 2005.

(51) Int. Cl.
*A01K 87/08* (2006.01)

(52) U.S. Cl.
USPC .................. 43/18.1 CT; 43/18.1 R; 43/24

(58) Field of Classification Search
USPC .................................. 43/18.1 CT, 18.1 R, 24
See application file for complete search history.

(56) References Cited

U.S. PATENT DOCUMENTS

| | | | |
|---|---|---|---|
| 364,350 A | 6/1887 | Huth | |
| 521,704 A | 6/1894 | Davis | |
| 814,321 A | 3/1906 | Pepper, Jr. | |
| 863,606 A | 8/1907 | Hoerle et al. | |
| 1,843,714 A | 2/1932 | Fuller | |
| 1,964,631 A | 6/1934 | Hansen | |
| 2,394,706 A | 2/1946 | Makie | |
| 2,702,959 A | 3/1955 | Wiglesworth | |
| 2,855,717 A | 10/1958 | Heil | |
| 3,060,618 A | 10/1962 | Grishkin | |
| 3,210,881 A | 10/1965 | Wilson | |
| 3,403,468 A | 10/1968 | Bartoletti | |
| 3,421,248 A | 1/1969 | Kennedy | |
| 3,769,737 A | 11/1973 | Miyamae | |
| 4,014,127 A | 3/1977 | Turner | |
| 4,020,581 A | 5/1977 | Genovese | |
| 4,027,419 A | 6/1977 | Popeil | |
| 4,168,812 A | 9/1979 | Karlsson | |
| 4,209,931 A | 7/1980 | Vance | |
| 4,620,371 A | 11/1986 | Murakami et al. | |
| 4,634,072 A | 1/1987 | Stealy | |
| 4,693,029 A | 9/1987 | Yamamoto et al. | |
| 4,697,758 A | 10/1987 | Hirose et al. | |
| 4,807,385 A | 2/1989 | Morishita | |
| 4,934,628 A | 6/1990 | Yamaguchi | |
| 5,193,763 A | 3/1993 | Sakaguchi | |
| 5,236,147 A | 8/1993 | Kaneko | |
| 5,276,991 A | 1/1994 | Stotesbury et al. | |
| 5,395,065 A | 3/1995 | Hirose | |

(Continued)

*Primary Examiner* — Christopher P Ellis
(74) *Attorney, Agent, or Firm* — McHale & Slavin, P.A.

(57) ABSTRACT

A rod and reel assembly for deep water fishing. The rod employs a structure that eliminates the need for line guides along the length of the structure by use of a swivel guide that maintains the line between two rod members. The swivel roller is placed at the distal end of the structure allowing fishing line deployed from a mounted reel to the swivel roller to pass unobstructed through the structure. Also disclosed is an electric reel that includes a cantilever spool having an enlarged interior allowing hand control of free spooling. A two stage drag system employs a first set of springs to allow hands free spooling with minimal drag and a second set of springs for proper setting for the fish hauling.

20 Claims, 17 Drawing Sheets

(56) References Cited

U.S. PATENT DOCUMENTS

| | | |
|---|---|---|
| 5,503,341 A | 4/1996 | Kaneko et al. |
| 5,833,154 A | 11/1998 | Kaneko |
| 6,016,621 A | 1/2000 | Maeda |
| 6,053,443 A | 4/2000 | Nanbu et al. |
| 6,056,218 A | 5/2000 | Nanbu |
| 6,102,316 A | 8/2000 | Nilsen |
| 6,126,103 A | 10/2000 | Nanbu |
| 6,393,753 B1 | 5/2002 | Walker |
| 6,561,033 B2 | 5/2003 | Nanbu et al. |
| 6,763,628 B1 | 7/2004 | Bartlett |
| 6,802,151 B1 | 10/2004 | Jochum |
| 6,931,781 B2 | 8/2005 | Markley et al. |

DEEP WATER FISHING ROD AND ELECTRIC REEL

PRIORITY CLAIM

This application is a continuation of U.S. patent application Ser. No. 12/505,099, filed Jul. 17, 2009, now abandoned which is a continuation-in-part of U.S. patent application Ser. No. 11/355,911, filed Feb. 16, 2006, now abandoned, which claims a priority date of Feb. 17, 2005 based upon U.S. Provisional Patent Application No. 60/654,386, the contents of all of these applications are incorporated herein by reference.

FIELD OF THE INVENTION

The field of the invention is related to fishing and in particular to a rod and electric reel for use in deep sea fishing.

BACKGROUND OF THE INVENTION

Fishing in water depths between 300 and 2000 feet is known as deep water fishing. Deep water fishing is considered one of the most productive types of fishing due to the abundance of fish at these lower depths. However, the ability to fish in deep water requires special equipment that is typically expensive, complicated, and otherwise unusable by recreational fisherman.

The tactic of deep water fishing requires equipment capable of placing lures/bait at deep water depths and the ability to retrieve the fish that has taken the bait. As a boat cannot anchor in such depths, the need to weight the bait is necessary while the boat drifts and/or currents move the bait. The higher the weight, the quicker the bait can be positioned. If a high wind is present, the boat may drift at a disproportionate rate to the bait. If a boat is fishing in an active body of water such as the Gulf Stream, currents and winds seldom move in unison wherein a weight upwards of 30 lbs may be necessary to properly sink and maintain the bait at a proper depth. The need to free spool to a fishing site yet "feel" the bottom when the weight hits the sea floor is required for successful fishing. Further, the ability to withdraw the weight which is compounded by the weight of a fish, makes the use of conventional fishing gear impractical.

To address this situation, attempts have been made to use various types of power driven reels placed on devices that resemble a winch. Electric reels were driven from aircraft surplus 27 volt motors because of their low weight and good performance when attached to a drive 10/0 or 12/0 hand crank reel. Eventually these reels were replaced by commercial electric or specially built electric motors which were heavy and bulky. The use of 12 volt electric models were low on power when attached to modify a fishing reel. However, the use of higher voltage required a special power supply and typically could only be used on boats having 24 or 32 volt systems.

Hydraulic fishing reels were also used but required expensive systems and motors that employed moving valves that required high maintenance to inhibit corrosion caused by salt water use, even minimal corrosion resulted in failure of the hydraulic motors.

Still another problem with current equipment used in deep water fishing is the inability to accurately estimate the length of line that has been deployed. Such a measurement allows the fisherman to determine the depth of the bottom and, if the bait has not engaged the bottom, what additional weight is necessary to reach the desired depth due to bait drift.

Another problem with current equipment used in deep water fishing is that the rod and reel requires a very large amount of line that must be controlled as it is directed over the side of a boat. While the use of a conventional fishing rod is preferred, a conventional fishing rod employs a plurality of guide tips. Guide tips introduce drag which caused friction. Friction on a fishing line affects the longevity of the line. Even if all the guide tips included rollers, each roller can introduce a stress to the line. For instance, if the roller bearing has any corrosion, it can quickly generate friction that will ultimately affect line strength. Salt can collect on the outer surface of the roller creating imperfections that can destroy the bearing operation. Further, should the fishing line break the use of conventional guide tips require threading of line which can be most difficult especially if a boat is subjected to sea movement during the threading process.

PRIOR ART

The use of fishing reels with counters is well known in the art. Counting devices are exemplified by the following U.S. Pat. Nos. 4,697,758; 5,395,065; 5,503,341; 5,833,154; 6,053,443; 6,056,218; 6,126,103; 6,561,033; 4,934,628; 5,236,147; 4,620,371 and 4,634,072.

Fishing poles with quick mount guides are also known in the art and exemplified by the following U.S. Pat. Nos. 2,855,717; 3,210,881; 3,403,468; 4,807,385; 4,209,931; 4,693,029; 3,060,618; 2,702,959; 1,964,631; 863,606; 814,321; 4,020,581; 6,802,151; 3,769,737.

U.S. Pat. No. 4,014,127 discloses a heavy duty fishing reel designed to retrieve heavier weights such as that used in deep water fishing. This device includes a hand crank and a tackle mechanism which denies the fisherman use of the conventional style rod which is time proven to give the most control to the fisherman. Control of lure placement and fish retrieval is a mainstay of recreational or sport fishing.

U.S. Pat. No. 3,421,248 discloses a fishing rod having flexible rod members. The rod members are spaced apart by the use of connecting spacers which further act as line guides. The bending and flexing of the rods induce friction on the fishing line by adding directional line changes.

U.S. Pat. No. 1,843,714 discloses a fishing rod having multiple rods that are spaced apart but include the use of line guides along the length of the rod. The bending and flexing of the rod induces friction on the fishing line by adding directional line changes at each line guide along the length of the rod, and no provision is made to reduce the friction on the tip mounted line guide should an off angle pull occur.

U.S. Pat. No. 6,016,621 discloses a fishing rod having two sections, a first two rod section that narrows into a single piece section. The rod employs the use of line guides along the length of the rod and thus fails to address the friction induced by the line guides, or the friction induced from a tip mounted line guide should an off angle pull occur.

Current technology is to modify conventional fishing rods or booms for deep sea fishing. However, modification of conventional fishing equipment can not address the aforementioned problems due to inherent limitations such as the need for a plurality of guide rollers. Further conventional fishing rods are traditionally made from fiber glass rods or composites thereof. Down riggers may consist of a rod having a stretch rope pivoting on a boom. The end of the rod will have a pulley placed underneath the rod which is wasteful in vertical height and does not provide ready access for retrieving fish. Finally, because deep water electric reels and rods are larger than most hand cranks, they will not fit in a standard rod and reel storage holder. For this reason, the rod is usually disconnected from the reel to make storage easier, the end of the line removed to take the line through the rod line guides.

SUMMARY OF THE INVENTION

Disclosed is a deep sea fishing rod and reel that employs a reel butt adapted for holding a fishing reel, the rod is wishbone shaped formed from a first elongated member with a proximal end, a distal end and a length therebetween and a second elongated member having proximal end, a distal end and a length therebetween. The proximal ends of the elongated members are connected to the reel butt and the distal end of the first elongated member connected to said distal end of the second elongated member with the lengths between the first and second elongated members spaced apart. A swivel guide is positioned at the distal end of the elongated members for directional placement of a fishing line between the proximal end and the distal end of the elongated member.

A reel main body secured to the rod butt, the reel body having a spool drive shaft with a cantilevered spool rotatably secured to the spool drive shaft. The cantilevered spool has an inner surface and an outer surface, the inner surface sized to receive the fisherman's fingers to permit manual braking of the spool through frictional engagement. The outer surface of the cantilevered spool is adapted to receive a fish line thereon wherein the cantilevered spool is rotatably secured to said reel main body allowing spool removal without disassembly of the fish line.

The deep sea fishing reel includes a first set of engaging springs sized to permit light drag to allow free spooling, and a second set of engaging springs for fish hauling. The first set of engaging springs induce a light drag and the second set of engaging springs induce a heavy drag, the second set of engaging springs providing secondary engagement to the first set of engaging springs. The fishing reel is driven by an electric drive motor having a counter to determine length of line deployment and ease of retrieval. A swivel guide couples to the distal end of the fishing rod. The swivel guide allows removal of the fishing line without removal of end line tackle.

An objective of the instant invention is to disclose a deep water rod that eliminates line guides.

Another objective of the instant invention is to disclose a deep water rod that eliminates line guide tip stress both in vertical and off vertical line placement.

An objective of the instant invention is to disclose a deep water rod and reel that employs a two stage drag system for free spooling and fish retrieval.

Still another objective of the instant invention is to provide a spool design that allows a fisherman to control spooling through fingertip engagement of the inner surface of the spool.

Yet another objective of the instant invention is to provide a cantilever spool design that allows for quick spool change for replacement of lines or line types.

Another objective of the instant invention is to provide a two stage drag system that has a first set of engaging light springs to allow free spooling with hands off operation with a very light drag and a second stage drag engaging after the first stage for proper setting for fish hauling.

Another objective of the instant invention is to teach a cantilevered level winder allowing for an unobstructed handling of the free end of a cantilevered spool.

Still another objective of the instant invention is to provide a wishbone rod design with an over center rod swivel tip.

Another objective of the instant invention is to provide a swivel tip that will follow off center pulling and provide the appropriate rod twist to maintain a centrally located fishing line.

Another objective of the instant invention is to provide a swivel tip having non corrosive ball bearings in an open configuration allow fresh water rinsing after use.

Still another objective of the instant invention is to provide a swivel tip thread with a guide bar so that line can be removed from the rod without removing the end tackle.

Yet another objective of the invention is to provide a cantilevered level wind allowing a fisherman to remove the spool, fishing line, and end tackle without disassembly of the fishing line.

Still another objective of the instant invention is to provide a swivel tip that operates as a union for two free rod ends allowing the rod to twist while maintaining a centrally positioned fishing line.

Yet another objective is to provide a thermoplastic rod having two fishing rods supporting one line, the fishing rods are not rigidly fixed at the tip.

Yet another objective is to provide a rod having two fishing rods supporting one line that are shaped in a configuration to keep the fishing line from touching either rod while a swivel tip rotates the rod ends.

Still yet another objective is to provide a rod base that allows ease of removal of the rod without tools. The rod may be inserted upside down for kite fishing.

Yet another objective is to provide a cone shaped attachment of the reel to the reel base to the rod, allowing ease of rotation and removal as needed.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE INVENTION

Figure 1:
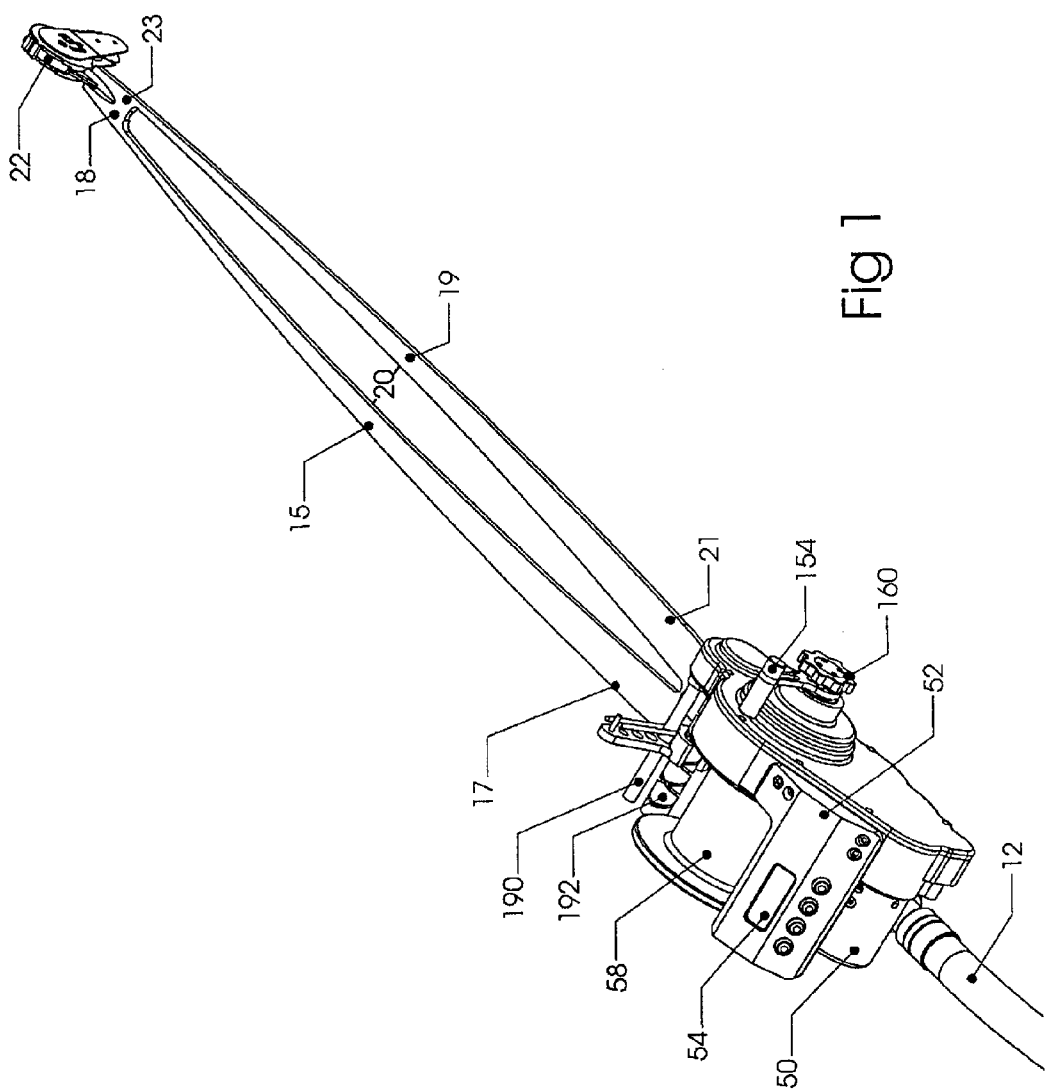
FIG. 1 is a perspective view of the fishing rod and reel of the instant invention.
Figure 2:
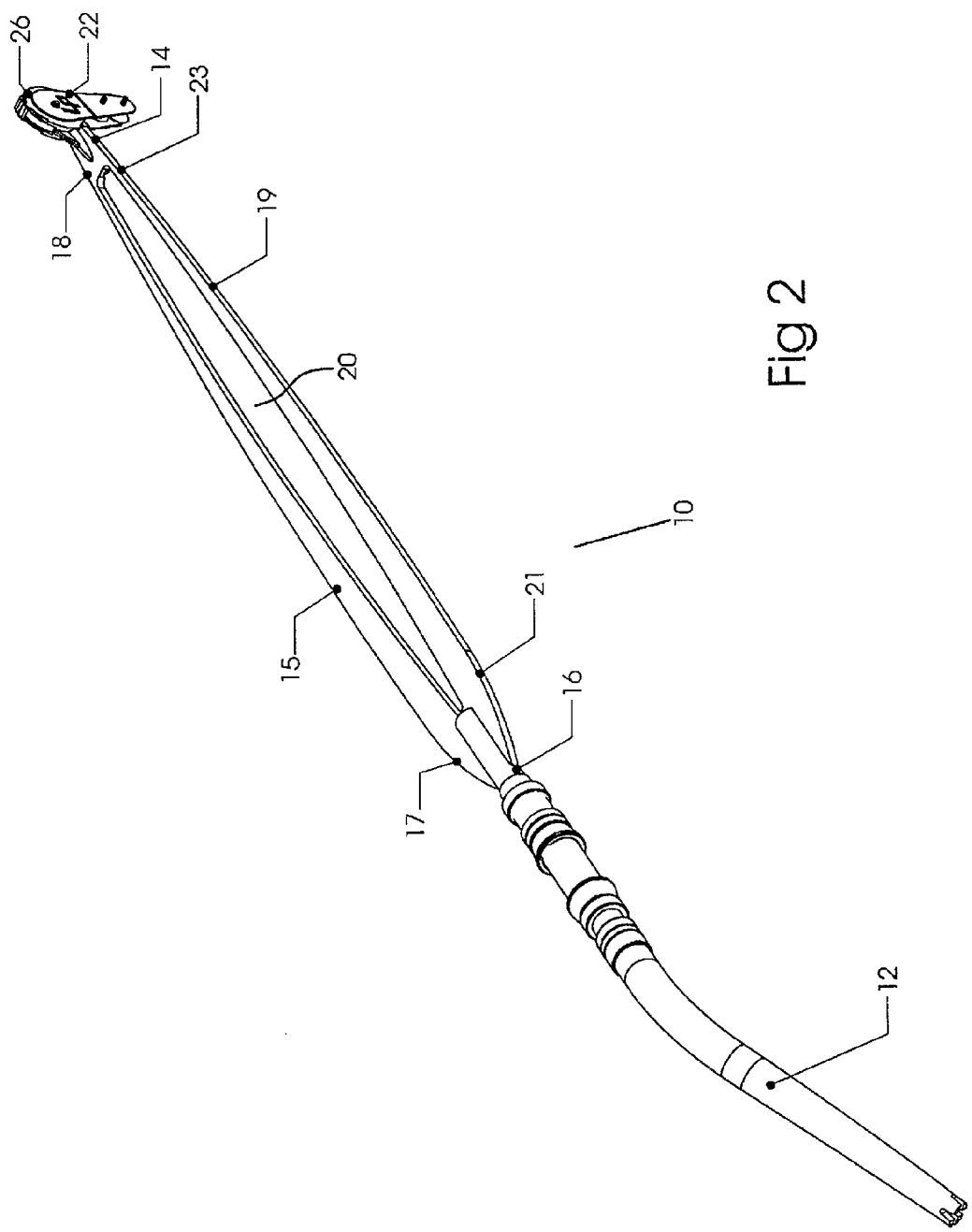
FIG. 2 is an perspective view of the rod shown in FIG. 1.

Now referring to the Figures, set forth is a fishing rod 10 of the instant invention defined at one end by a rod holder butt 12 and at the opposite end by a swivel guide tip 14. The rod 10 further includes a flexible rod portion 24 defined by a proximal end 16 and distal end 18 formed into a wishbone shape having minimum thickness. The flexible rod portion 24 includes a first elongated member 15 having a proximal end 17, a distal end 18 forming a length therebetween. A second elongated member 19 has a proximal end 21, a distal end 23 forming a length therebetween. The proximal ends 17 and 21 of the elongated members are connected 16 to the reel butt 12. The distal end 18 of the first elongated member 15 is connected to the distal end 23 of the second elongated member 19 along end section 14 whereby the elongated members 15 and 19 are spaced apart forming an opening 20. A fishing guide means 22 is positioned at the distal ends 14 of the elongated members for directional placement of a fishing line between a fishing reel mounted on the reel butt, shown in various drawings, and the fishing guide means 22. The rod portion formed into the wishbone shape as defined by a centrally disposed opening 20 is preferably formed by a flat rod constructed from titanium, aluminum alloy, aluminum flat bar, injection molded plastic, plastic filled with glass, carbon fiber, combination of glass and carbon fiber, or the like that allows flexibility along one plane. A swivel guide tip 22 is removably mounted at the distal end 14 of the rod structure 24 which permits directional tracking of fishing line as it is spooled or retrieved from a spool. The wishbone shape is illustrated by a flat bar elongated member 15 having a proximal end 17 having a first width and a distal end having a second width 18, the first width wider than the second width.

When the rod structure 24 is in a passive condition, fishing line from a spool mounted on the reel extends above the opening 20. When the rod structure 24 is working, such as when a high load is placed on the assembly due to fish retrieval, the rod structure 24 will bend in a similar fashion as a conventional fishing pole. However, in the instant invention, the fishing line will extend through the opening 20 following a straight line between the spool and the rod tip, the opening 20 allowing a straight line passage. This eliminates the problem of conventional rods that require a plurality of guides to maintain the fishing line. Further, the higher the loading on the line, the higher the pressure on the guide tips all of which leads to early line failure. The removal of guides eliminates any friction that could be caused thereby and the guide tip maintains the line in a centrally disposed position during high loading.

Figure 3:
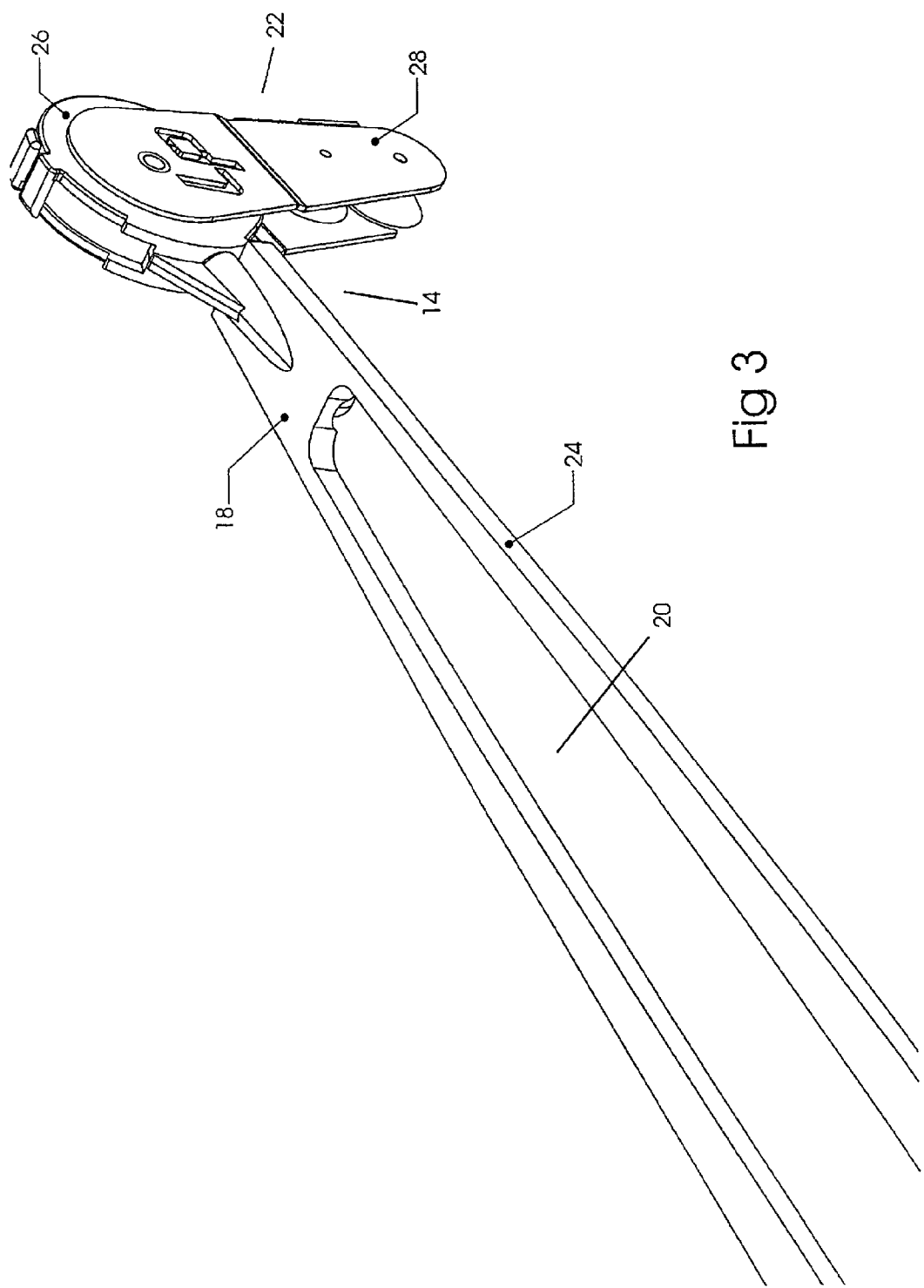
FIG. 3 is an enlarged view of the swivel rod tip shown in FIG. 1.
Figure 4:
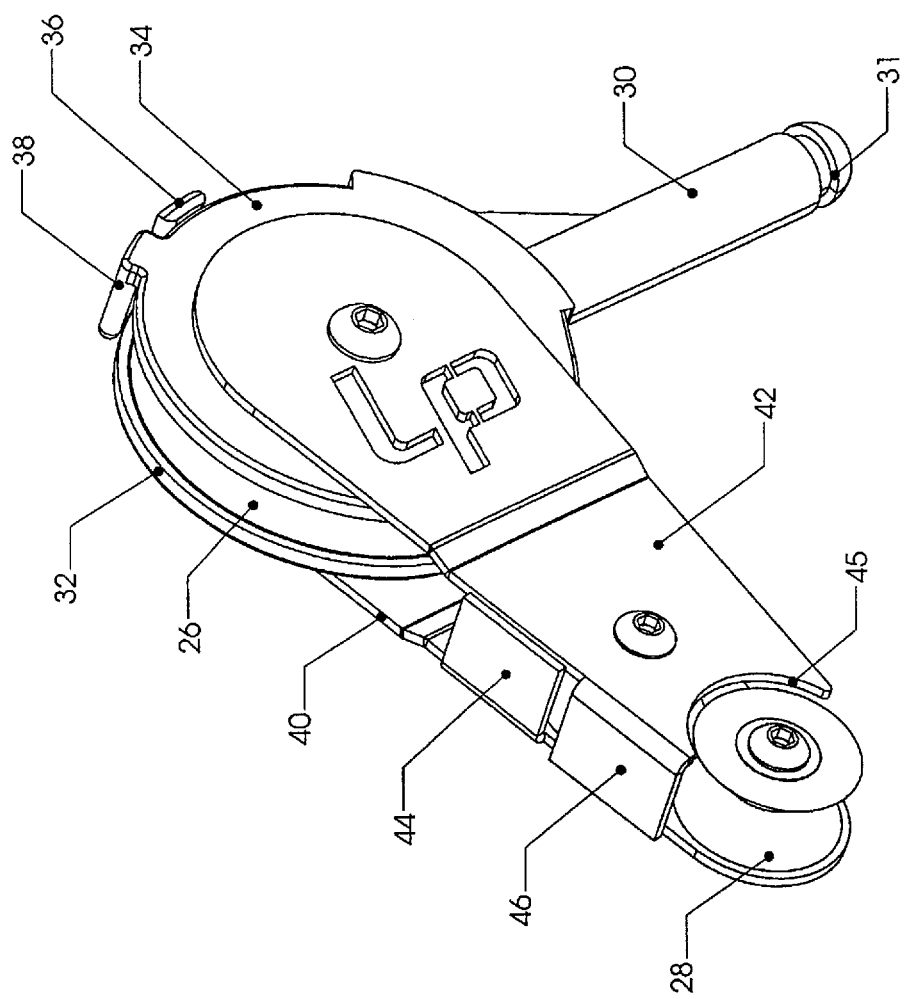
FIG. 4 is a perspective view of the swivel rod tip of FIG. 3.

FIGS. 3 and 4 depict the fishing guide means or swivel guide tip 22 which basically consists of rollers 26 and 28. When a line wraps around the upper roller 26, it is positioned for passage over lower roller 28. A swivel insert 30 allows for quick disengagement of the rod tip for storage or replacement. An inset end 31 of the swivel insert 30 if formed by a recess that permits frictional engagement of the receiver end on the fishing rod. The inset end 31 is operatively associated with an engaging prong, not shown, located on the inside of the rod end. The inset end is an illustration of a preferred embodiment but is not limited to the various frictional engagement mechanisms that can be substituted. a The swivel tip can be quickly changed if different line sizes are employed with the insert 30 functioning as a pinion to maintain the fishing line in proper alignment with the line end tackle at all times.

Sidewalls 32 and 34 secure upper roller 26 with spaced tabs 36 and 38 which allows the line to be snaked through the tabs for placement onto the roller. Similarly, sidewalls 40 and 42 include spaced tabs 44 and 46 which allow the line, not shown, to be snaked through around the tabs for placement over the lower roller 28.

The swivel insert 30 is coupled to the first grooved upper roller 26. The first grooved upper roller is for receiving of a fishing line from a spool mounted on the fishing rod. The first grooved upper roller allows the fishing line to rotate about an axis substantially perpendicular to axis plane of the fishing rod. The first grooved upper roller includes a first tab 36 coupled perpendicular to an edge of a first side wall 32 and extending over the grooved roller 26. A second tab 38 coupled perpendicular to an edge of a second side wall 34 and extending over the grooved roller 26. The first tab 36 is offset and spaced apart from the second tab 38 whereby a fishing line can be placed between the tabs to allow engagement with the grooved roller.

A second grooved roller 28 is secured to the swivel insert 30 and spaced apart from the first grooved roller 26 by a first bracket sidewall 40 and a second bracket sidewall 42. The second grooved roller 28 includes a first bracket tab 44 formed perpendicular to an edge of said bracket first side wall 40. A second bracket tab 46 formed perpendicular to an edge of a bracket second side wall 52. The first bracket tab 44 is offset and spaced apart from the second tab 46 whereby a fishing line can be placed onto the second grooved roller 28 by placement of the line through the spaces formed by the bracket tabs. The bracket first side wall 52 provides support for the roller 28 with the bracket second side wall 42 having a end edge 45 that allows access to roller 28 for ease of removal, changing of rollers to allow various roller line grooves to handle different line sizes, as well as access to all areas of the second roller 28 should line tangling or debris interference takes place. The swivel tip allows removal from the rod without the need for removing line end tackle.

Figure 5:
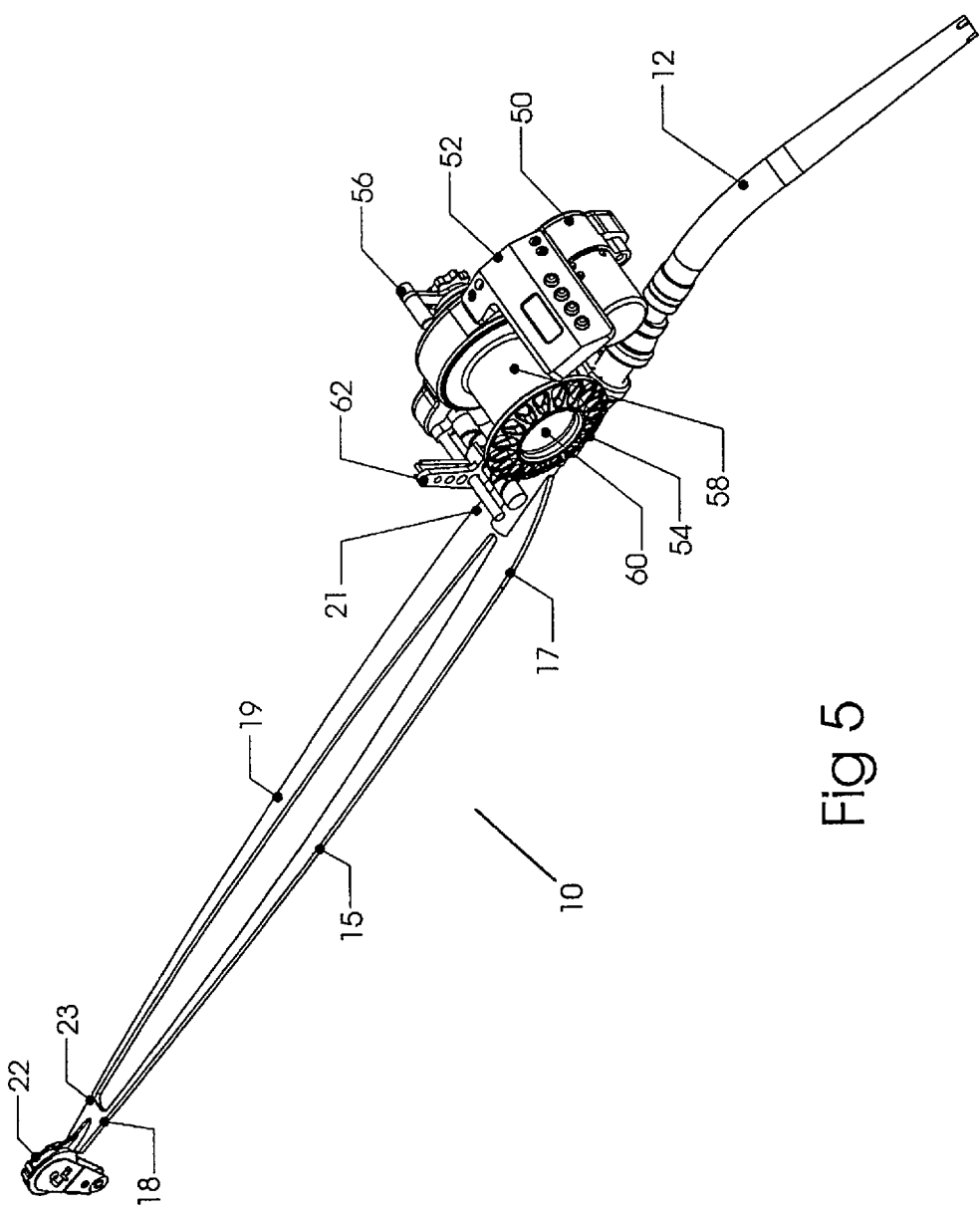
FIG. 5 is a perspective view of the fishing rod and electric reel.

The wishbone rod 24 with swivel tip 22 and butt 12 are again illustrated in FIG. 5. In this illustration, electric reel 50 is shown mounted to the rod. The reel having a control panel and display 52, a cantilever spool 54 and a drag lever 56. Line is wrapped around the cantilever spool 54 along the upper surface 58. An inner surface 60 allows for hand insertion of the fisherman to control free wheeling of the spool wherein the hand can be used as for braking. The hand providing sensory touch to determine when free wheeling must stop which can be felt though the fingers. Instant stop of free wheeling will prevent over spooling and associated line tangling. During rewind, a lever winder 62 prevents proper trapping of the line over the spool 54. The spool 54 is rotatably secured to a spool drive shaft extending from the main body of the reel 50.

Figure 6:
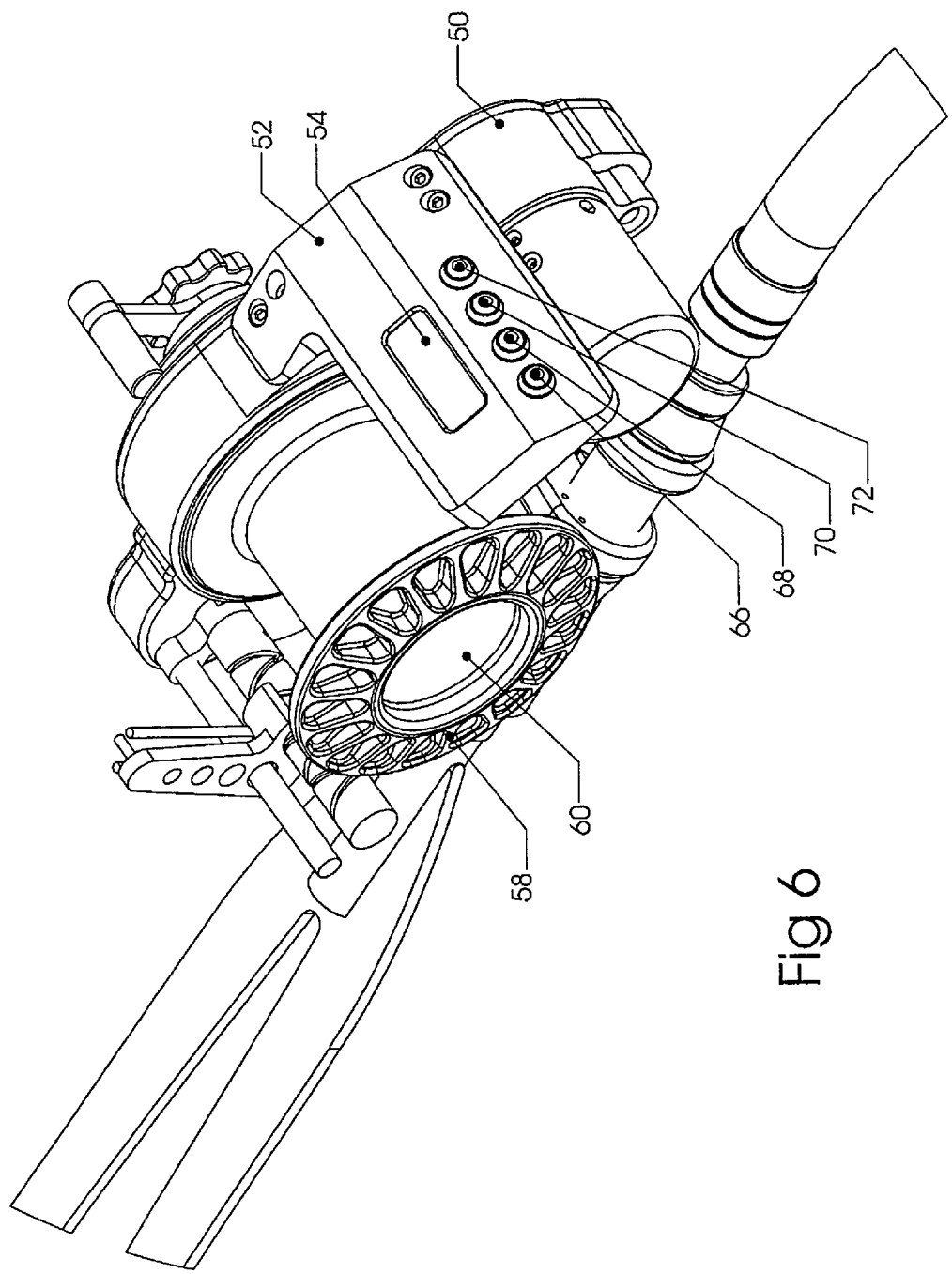
FIG. 6 is a perspective view of the fishing reel.
Figure 7:
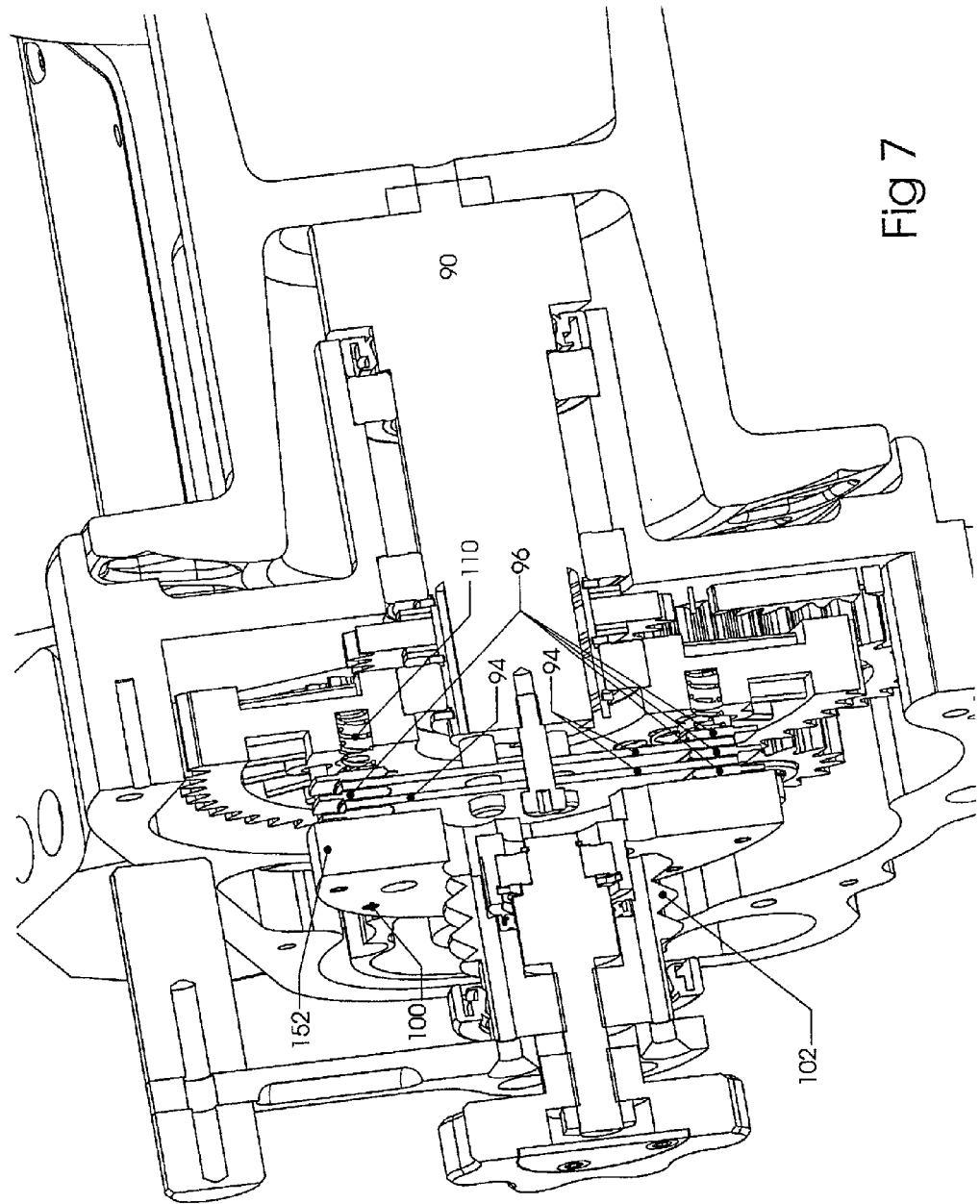
FIG. 7 is a cross section of the fishing reel.

FIG. 6 is an enlarged view of the electric reel 50 showing the display panel 52 with the memory line counter 64. The display panel 52 includes a series of switches to control a microprocessor. Switch 66 turns the unit on, switch 68 provides an off condition. Switch 70 zeros out the line counter and switch 72 can be used to set the line stop.

The cantilever spool 58 includes an enlarged center section 60 for placement of the operator's hand and ease of access for quick disconnect. Replacement of the spool can then be performed quickly should a separate or different line be required. This further allows for removal of the spool with fishing line and lure attached. For instance, if a line becomes tangled and the fisherman is desirous of saving the rigging, the spool, line, and rigging can be quickly removed and replaced. Further, spools with lines can be prerigged during non-fishing times, such as on shore, wherein a rod and reel can be customized to the fish and sea conditions with minimal effort.

Referring now, in general, to FIGS. 7 through 12 set forth is the operating mechanism of the instant reel. The reel includes main shaft 90 shown with shaft pins 92. A plurality of flat plate drives 94 with sintered bronze drag plates 96 are used for drag. A drive spur 98 is couple with drive spur pins 100. Drag advance threads are depicted by numeral 102. The spool drive shaft 90 is coupled to a drive gear 152, the drive gear having a first set of engaging springs 110, the first set of engaging springs 110 sized to permit light drag to allow free spooling of the spool. The drive gear 152 includes a second set of engaging springs 112 that provides for fish hauling. The two stage drag system permits free spooling with hands off operation with a very light drag by use of the light spring and the second stage drag engaging after the first stage for proper setting for fish hauling. The first set of engaging springs induces a light drag and the second set of engaging springs induces a heavy drag. The second set of engaging springs providing secondary engagement to the first set of engaging springs.

Deep water bottom fishing requires attention by the operator to keep the reel from backlashing while free spooling, as well as to sense the bottom when the lure/bait touches bottom to immediately stop additional free reeling before slack line causes tangling, kinking and prevents fish strike sensitivity. This is typically performed by pressing slightly on the inner surface of the spool with at least one digit (finger) of individual while in free spool allowing the fisherman to sense the speed and bottom impact. Preferably the fisherman will place a three or four digits within the spool to cause the proper braking.

The main drive shaft 90 which is maintained in position by use of drive bearings 106. The drive plates 94 are biased by low 110 and high drag setting springs 112. The main drag threaded adjuster is depicted by numeral 102 with drag lever main adjuster depicted with numeral 112. The fine tuned drag threaded adjuster 114 operates in conjunction with the drag fine tune knob 116.

The reel operates in a two stage drag system wherein the first set of engaging light springs 110 allows for free spooling with hands off operation providing a very light drag. The second set of high setting drag springs 112 engage after the first stage for proper setting to allow fish hauling.

Figure 8:
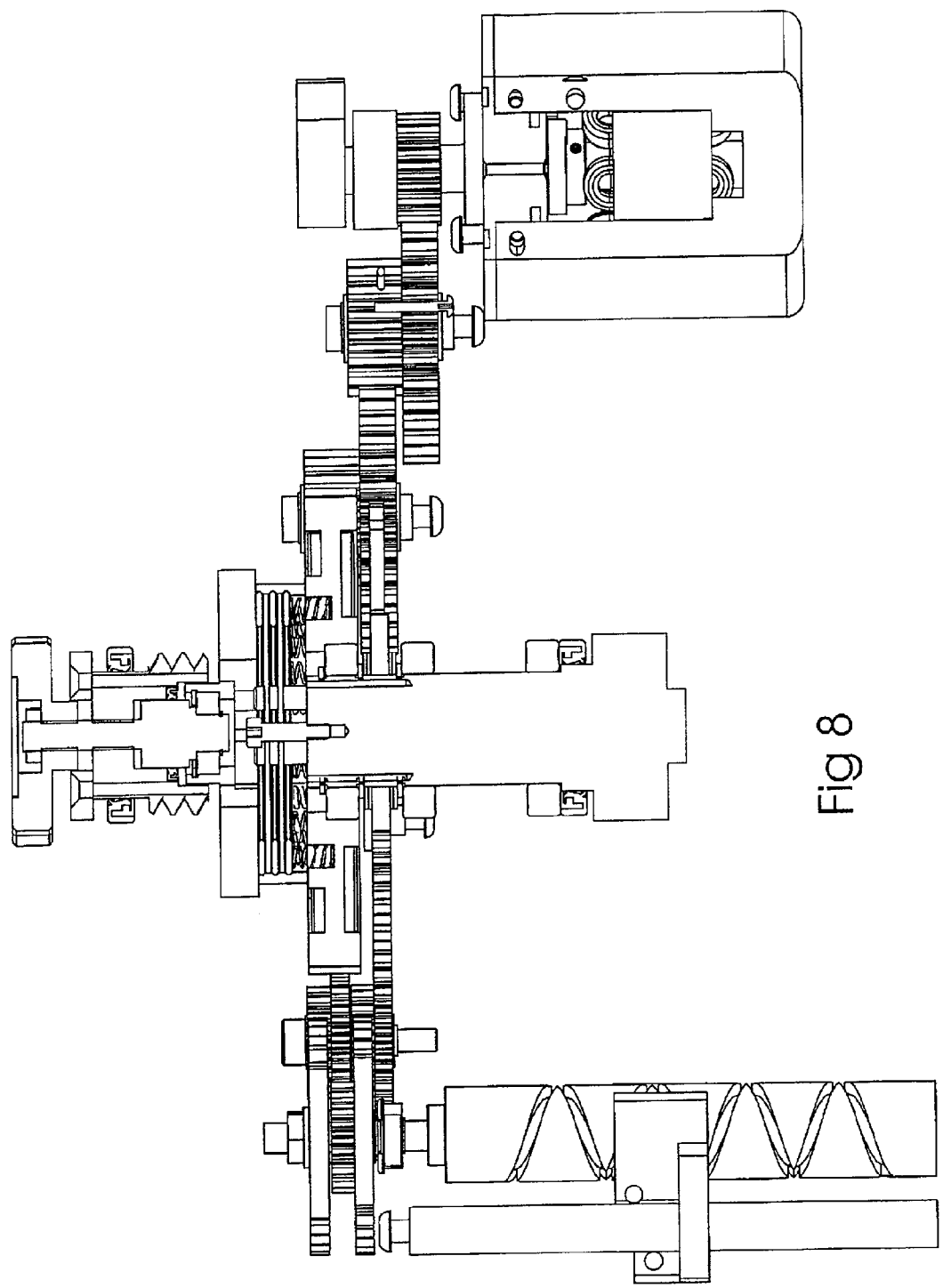
FIG. 8 is a cross sectional pictorial view of the gearing mechanism of the fishing reel.
Figure 9:
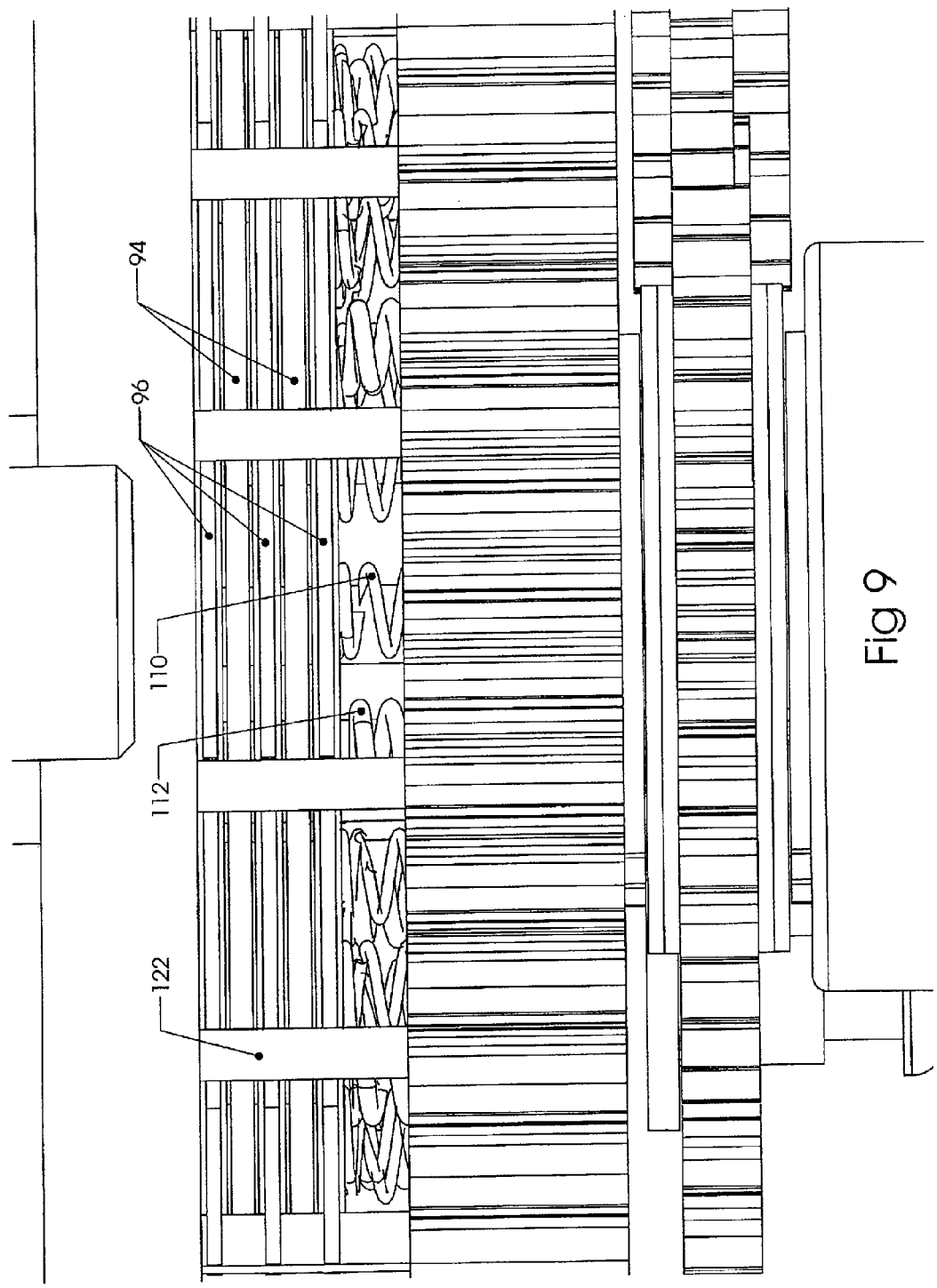
FIG. 9 is an enlarged side view of the drive spur.
Figure 10:
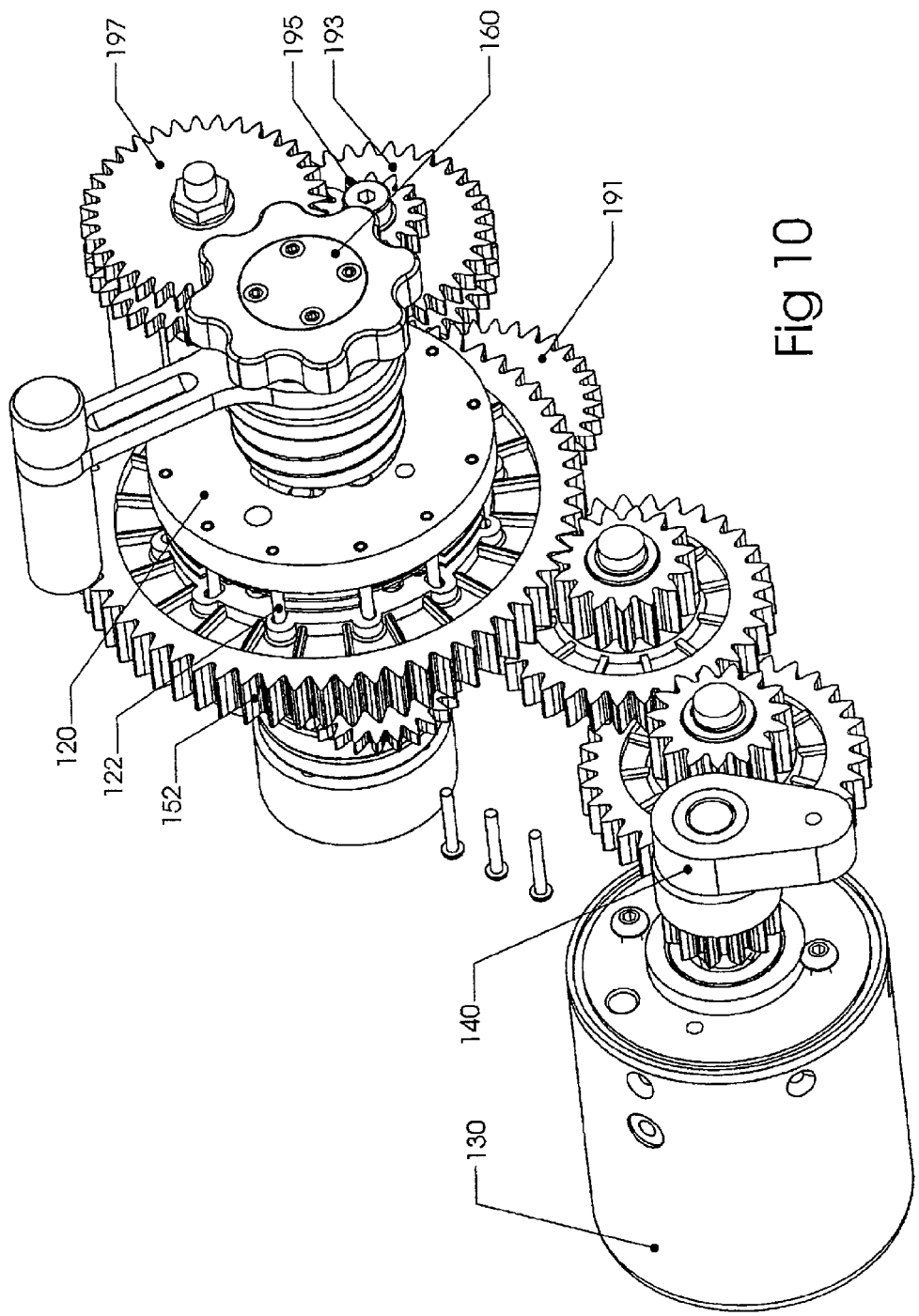
FIG. 10 is an exploded view of the gears for the drive mechanism.
Figure 11:
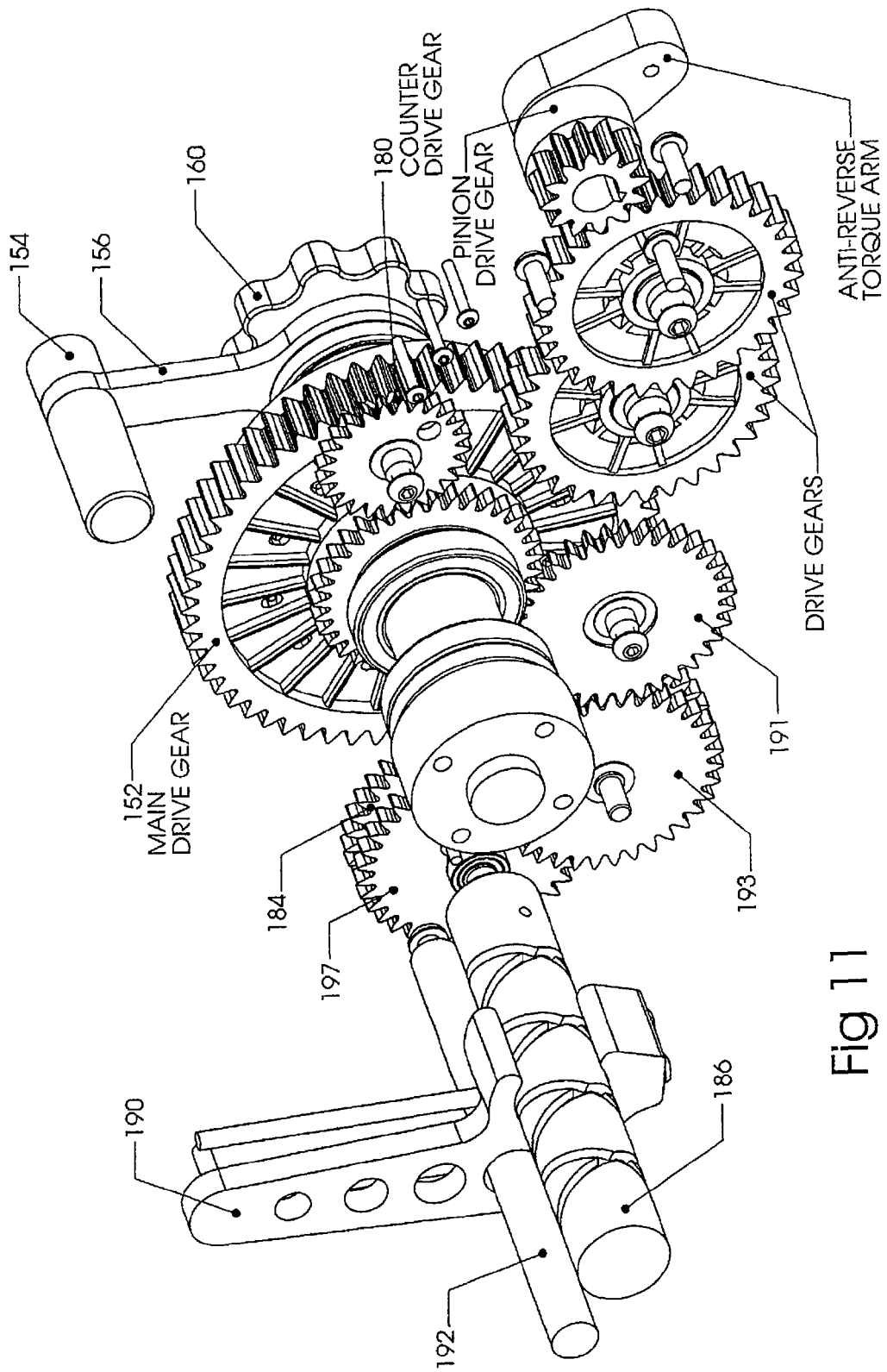
FIG. 11 is an exploded view of the drive mechanism and level winder.
Figure 12:
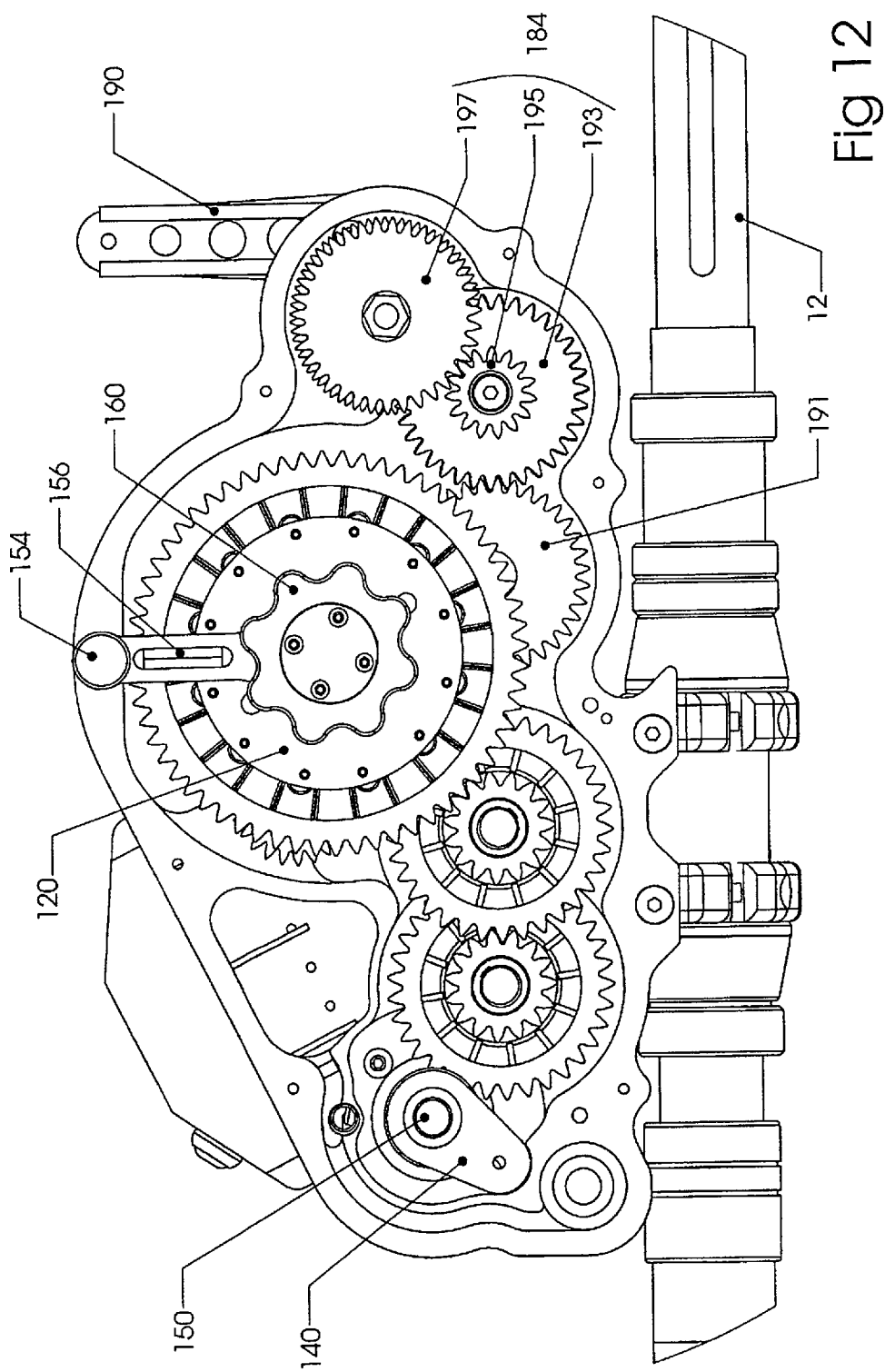
FIG. 12 is a side view of the drive mechanism.
Figure 13:
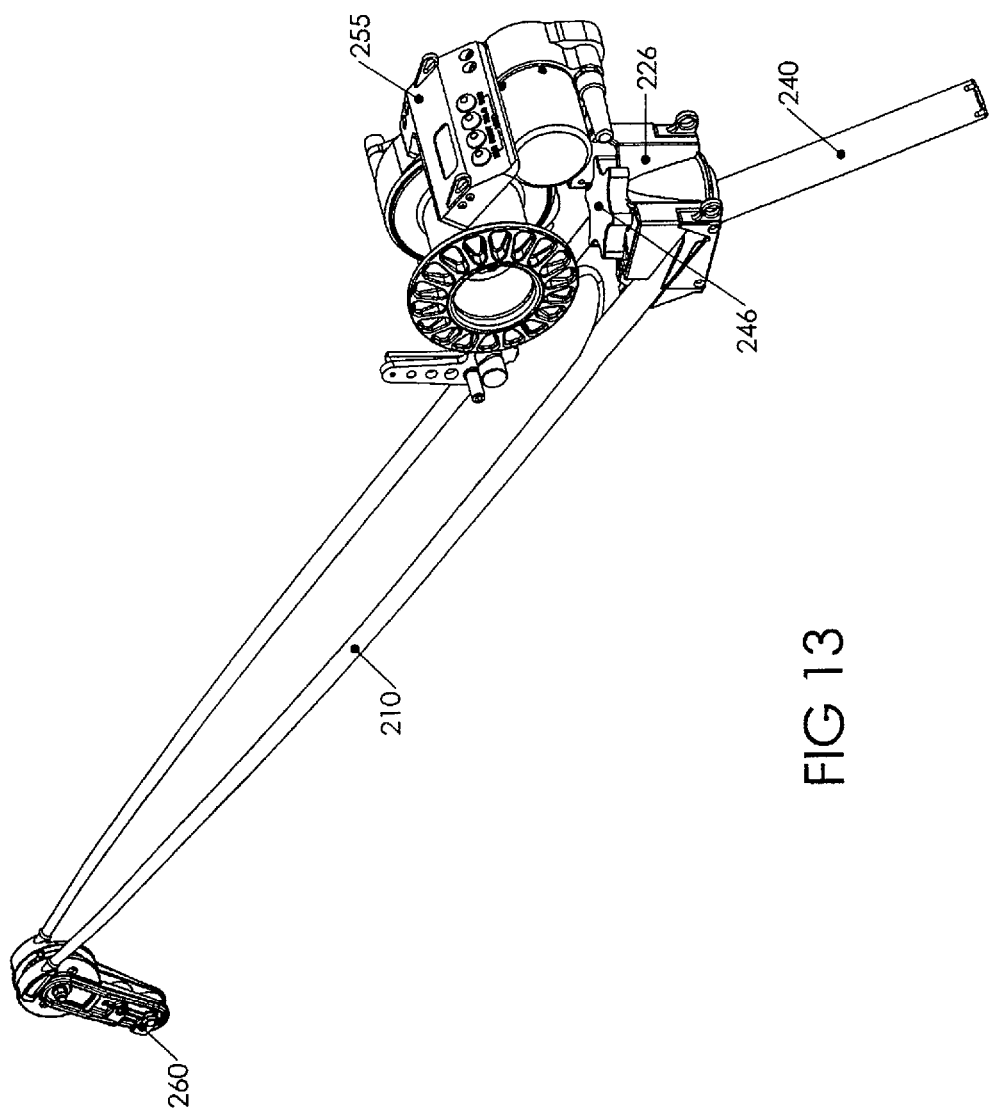
FIG. 13 is a perspective view of an alternative embodiment of the fishing rod and reel of the instant invention.
Figure 14:
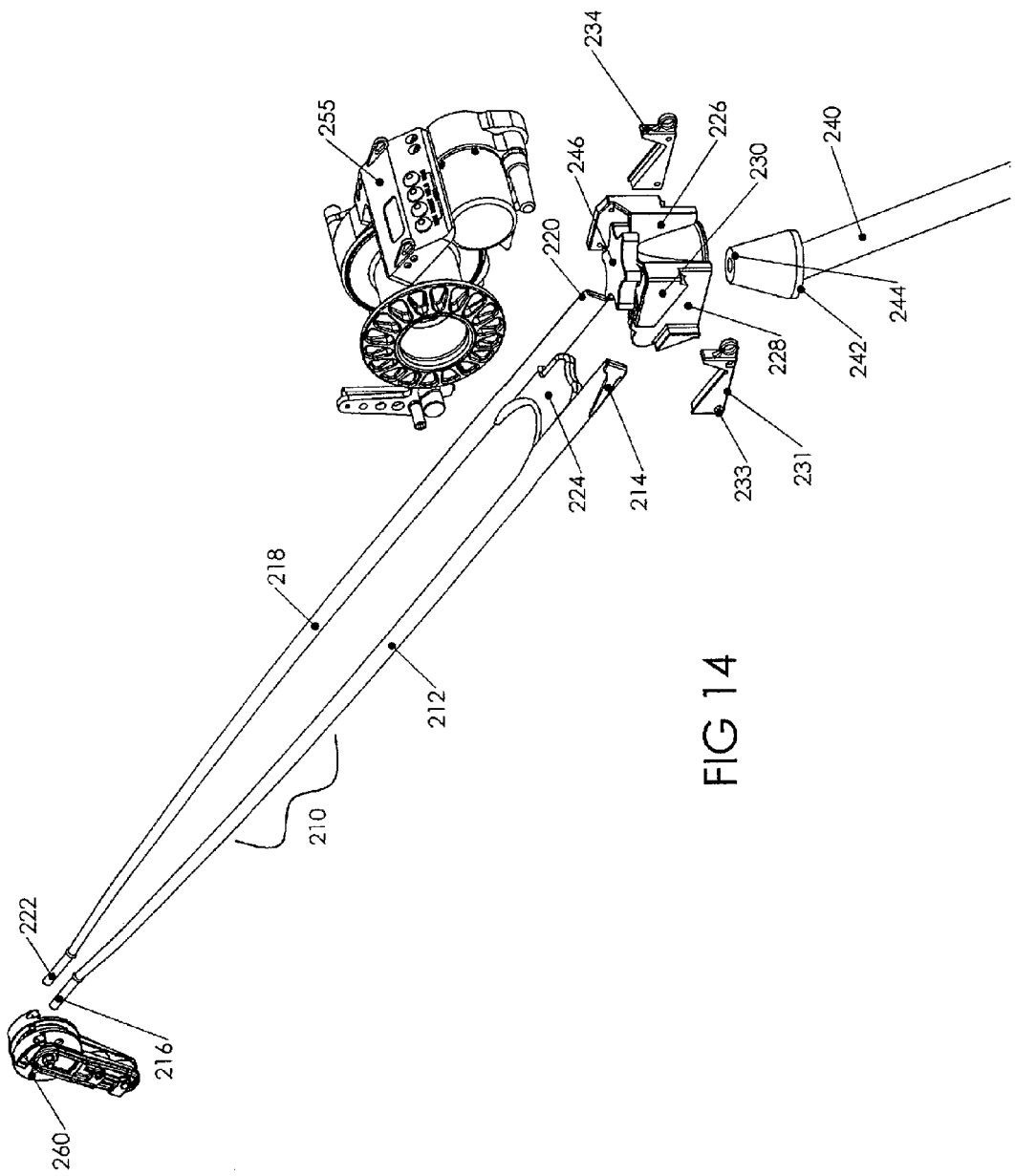
FIG. 14 is an exploded view of FIG. 13.

FIG. 9 provides an enlarged view of the high setting drag springs 112 and low setting drag springs 110. The sintered bronze drag plates 96 are interposed with flat friction disc 94. The drive motor 130 further shown in FIG. 8 is preferably a 12 volt brushless D.C. motor which allows operation in most recreational vessels which typically employ a 12 volt charging system. However, it should be noted that various voltages can be provided including 24V and 36V which allows for smaller motor design.

An anti reverse torque lever 140 in conjunction with an anti reverse gear or alternatively a one way bearing 150. The main drive gear 152 works in conjunction with the drag drive spur 120. The drag control lever handle 154 is depicted with the drag lever 156. The fine adjustment 160 provides the drag limit adjustment.

The main drive gear 152 which is the used with a counter drive gear 180. The gears couple to the lever winder 182 though compound gears 184 for transfer of torque. The lever winder 186 includes a grooved shaft that allows for movement of a directional spool for placement of line around the storage spool. The lever winder is cantilevered by use of the level wind anti-rotation support bar 192 which allows the level winder guide 190 to slide along the support bar 192 by following the track of the level winder diamond shaft 186 providing directional positioning of fishing line on to the outer surface of the cantilevered spool. As shown in FIG. 21, the lever winder compound gears 184 are shown for coupling to the lever winder. Further depicted is a guide bar support for the lever winder numeral 190. A first compound gear 191 is rotated in response to the main drive gear 152, the first compound gear 191 drives a second compound gear 193 having a step down sprocket 195. The step down sprocket 195 drives a third sprocket 197 causing rotation of the level winder diamond shaft 186 and movement of the level winder guide bar 190 in relation thereto.

Now referring to FIGS. 13-17, set forth is a second embodiment of the instant invention. In this embodiment, the rod assembly 210 is fork shaped having a first rod member 212 with proximal end 214 and an independent distal end 216; and a second rod member 218 having a proximal end 220 and an independent distal end 222. The proximal ends 214 and 220 are adjoined by a common end coupler 224. The rod assembly 210 is formed from a material that is flexible and capable of maintaining an original shape. The material may be plastic, carbon fiber, fiberglass, titanium, or the like flexible material. In the preferred embodiment the rod assembly is formed from a single piece of thermoplastic sized and constructed to bend and twist in response to a predictable load factor. Unique to the use of a fork shape rod assembly is the ability for the rod members to bend and twist wherein a first rod member may be bend and twisting into a position beneath the second rod member. As there are no line guides, a fishing line can be positioned between the rod members without frictional interference.

The proximal end of the rod assembly slips into a mounting structure 226 having a channel 228 defined along a bottom edge by a lower alignment tab 231. The lower alignment tab is secured to the rod base by fasteners 233. Although the mounting structure and lower alignment tab may be formed as a single component, separate components permit undercutting during the manufacturing step of an upper alignment tab 230 while the lower alignment tab 231 is removed. With lower alignment tab 231 removed during the manufacturing step, each tab can be undercut or otherwise sized to receive the rod end 214.

Similarly, the mounting structure 226 has an alignment tab 234 positioned on the opposite side of the mounting structure. The proximal end of the rod assembly 210 is insertable into the channels formed between the alignment tabs located on structure. It should be noted that the rod assembly can be coupled to the structure 226 in a position where the fishing line will be directed downward through the swivel guide, or the rod assembly can be inverted which allows the use of the assembly for kite fishing where the fishing line is directed upward.

Once the rod assembly is slid into the channels of the mounting structure, it can be locked into position by use of a locking pin, not shown, or most any other friction engagement mechanism. A locking pin can pass through a rod member and engage the mounting structure. The rod assembly is secured by frictional engagement and can be easily removed by overcoming the interference fit induced between the rod assembly and the channel. Separating the rod assembly from the mounting structure allows for ease of transporting and storage. For instance, if a fishing rod is carried only by the rod, the use of a locking pin would prevent accidental dislodgement of the rod from the rod housing.

The mounting structure 226 is rotatably secured to a base 240 for placement into a standard fishing rod holder or any other means used for attaching to a boat. The base depicted includes a male conical shaped insert 242 that is positionable in the mounting structure 226 which has a female conical shaped receptacle formed along a lower end. The top of the male cone insert is threaded 244 for receipt of a threaded bolt 246 shown with a mounted knob to allow ease of rotation. The male cone is inserted into the structure and allows the structure to rotate over the conical shape. The tightening of the knob 246 causes frictional engagement between the structure and the base which secures the assembly to a preferred friction level which allows swivel of the assembly for various fishing conditions.

The distal ends 216 and 222 of the rod assembly 210 are independent of each other but coupled together by use of the swivel guide 260. The swivel guide maintains each end in a spaced apart configuration and, unique to this invention, allows the twisting and bending of the rods. The two fishing rods are shaped in a configuration so as to keep the fishing line from touching either rod as the swivel tip rotates the rod end. The illustrated electric reel 255 is the same as previously mentioned and illustrated to show the mounting location.

By way of example, a fishing line that is being pulled by a fish directly downward causes the rod assembly to bend wherein the fishing line would pass between the rod members originating from the reel and passing through the swivel guide, note that no line guide is required. Despite the weight or pulling capability of a fish, or an extreme flex of the rod assembly, the fishing line will not touch either rod member. Further, if a fish is pulling off center such as when a fish is running or the boat position in relation to the fish, the rod members 212 and 218 will bend and twist in response to the twisting angle placed on the swivel guide so that again the fishing line will not touch rod assembly. In operation should a large fish move from one position, relative to the boat, to another position, the swivel guide will effective point toward the direction of the fish thereby placing no sideward pressure on the fishing line. Further, the swivel guide will cause the rods to twist which maintains the fishing line between the rods at all times.

Figure 15:
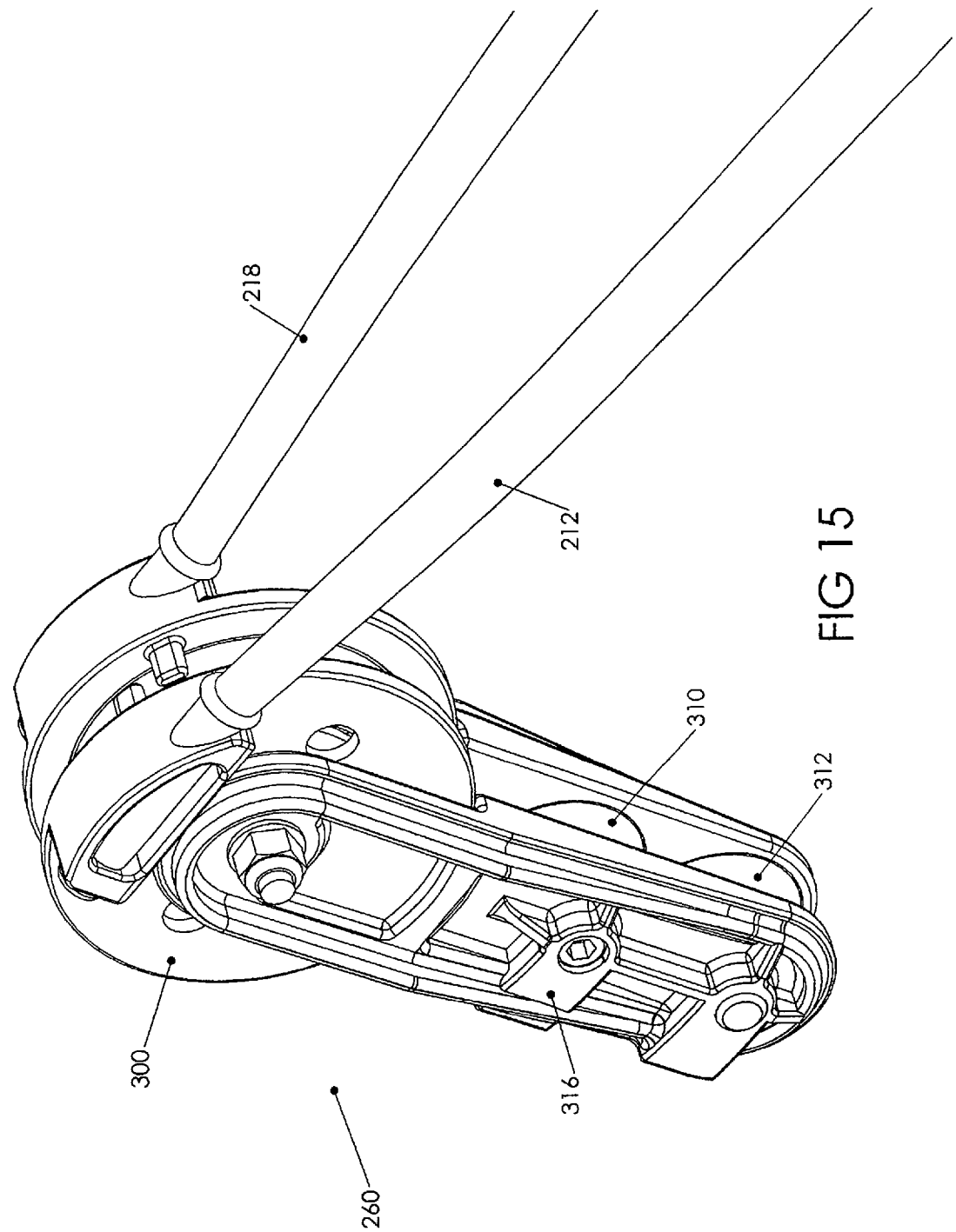
FIG. 15 is an enlarged perspective view of the swivel rod tip shown in FIG. 13.
Figure 16:
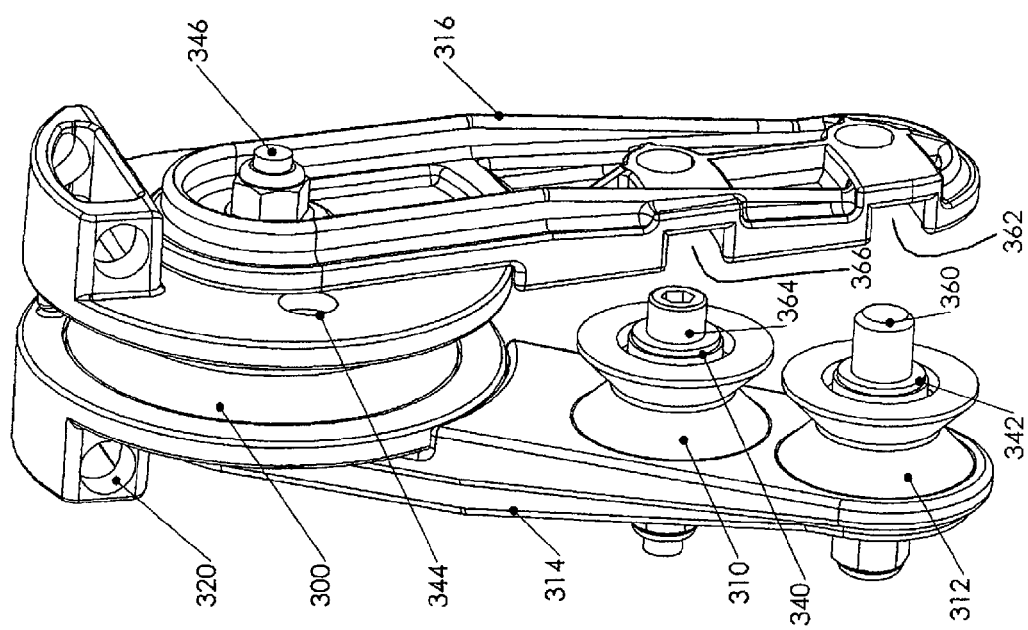
FIG. 16 is a view of the swivel rod tip of FIG. 15 in a an open position for receipt of a fishing line.

FIGS. 15 and 16 depict the swivel guide 22 which consists of guide roller 300, first alignment roller 310 and second alignment roller 312. The guide rollers are mounted to a guide tip housing having a base element 314 and a cover element 316. The base element 314 is coupled to rod tip receptacle component 320 used in securing the base element to the distal end of a first rod element. The base element further operates to support the guide roller 300, first alignment roller 210 and second alignment 312. The rollers are constructed and arranged to receive a fishing line which wraps around a portion of the roller for directional positioning of a fishing line. In this embodiment, a fishing line would wrap partially around guide roller 300 to first alignment roller 310 and over the second alignment roller 312. The cover element 316 is fastened to the base element along mounting bolt 346. The cover element securing the receptacle component 321 used in securing the cover element to the distal end of a second rod element.

Guide roller 300 uses an open bearing housing wherein the bearings are unsealed and viewable through rinse port 344. The rinse port allows for fresh water rinsing after salt water use eliminating disassembly. Similarly first and second alignment rollers 310 and 312 include the use of open bearings having rinsing apertures 342 and 344 also used for rinsing of the bearings after use. While conventional bearings are sealed, should the seal fail then salt water can enter and cause corrosion of the bearings. The use of an open bearing invites cleaning after each use to eliminate salt entry and otherwise prolong the life of the bearing and, depending upon the bearing and race type employed, may allow ease of either lubricating or coating with a corrosion inhibitor during storage. The cover element 316 is secured to the base element 314 by the bearing bolt 346 which further secures the guide roller 300 in position. The cover element rotates to an open position, as shown in FIG. 16, which allows positioning a fishing line while the end of the line is baited. Once the fishing line is in position the cover element 316 is rotated into a closed position wherein alignment post 360 of the second alignment roller frictionally engages slot 362, and mounting bolt 364 of the first alignment roller engages slot 366.

Figure 17:
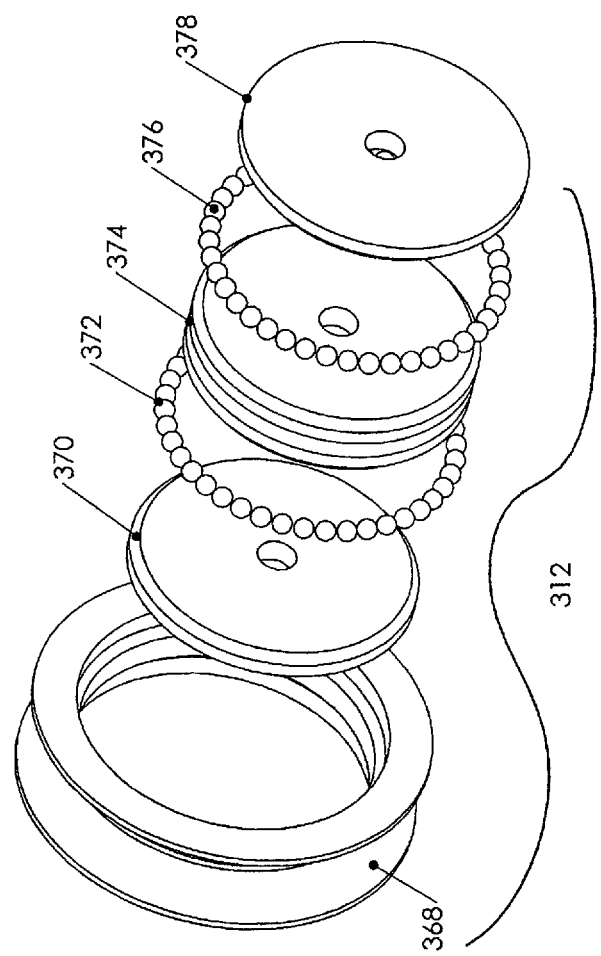
FIG. 17 is an exploded view of an open bearing used in the swivel rod tip shown in FIG. 15.

FIG. 17 illustrates the second alignment roller 312 having a circular line guide 368 with an inner and outer cover 370 and 378 housing a race 374 with corrosion free bearing sets 372 and 376 located on each side of the inner race. The race having a design to allow rinse water to enter the housing after use. In this manner, any salt water that coated the bearings can be easily rinsed after use.

It is to be understood that while I have illustrated and described certain forms of the invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A fishing pole comprising:
a rod assembly having similar shaped first and second rod members, said first and said second rod members being spaced apart and substantially parallel to each other, said first and said second rod members each having a proximal end and a distal end;
said rod assembly having a base coupled to said proximal end of each of said first and said second rod members, said base being constructed and arranged for receipt of a fishing reel having a deployable fishing line;
a swivel guide securable to each of said first and said second rod member distal ends, said swivel guide having at least one fishing line roller positioned therebetween for positioning of a fishing line deployed from the fishing reel around a portion of said roller into a downward direction; and
said swivel guide being the sole fishing line guide on said rod assembly;
wherein a fishing line deployed between the fishing reel and the fishing line roller can move uninhibited through the rod members throughout the bending and twisting of said rod members caused by fish movement.

2. The fishing pole according to claim 1 including a mounting structure, said rod assembly being secured to said mounting structure.

3. The fishing pole according to claim 2 wherein said mounting structure is securable to a fishing vessel.

4. The fishing pole according to claim 2 wherein said mounting structure includes a conical shaped base operatively associated with a conical shaped insert allowing rotation of said mounting structure in relation to said conical shaped insert.

5. The fishing pole according to claim 4 wherein said conical shaped insert includes a base member constructed and arranged for insertion into a conventional rod holder.

6. The fishing pole according to claim 4 including a friction inducing coupling to limit rotational ease of said mounting structure in relation to said conical shaped insert.

7. The fishing pole according to claim 1 wherein said rod assembly is secured to said mounting structure in an inverted position and said swivel guide is also in an inverted position for deployment of a fishing line in an upward direction.

8. The fishing pole according to claim 2 wherein said rod assembly is formed from a single piece of material.

9. The fishing pole according to claim 8 wherein said material is selected from the group of consisting of flexible materials that return to the original position after a flex has been introduced.

10. The fishing pole according to claim 8 wherein said material is thermoplastic.

11. The fishing pole according to claim 1 wherein said swivel guide includes a base element;
a guide roller secured to said base element;
a first alignment roller and a second alignment roller, said first and said second alignment rollers being secured to said base element;
a cover element rotatably secured to said base element, said cover element being movable between an open and a closed position, in said open position said cover allows the placement of fishing line around said guide roller, said first alignment roller, and said second alignment roller and in said closed position the cover maintains fishing line in position around said guide roller, said first alignment roller, and said second alignment roller.

12. The fishing pole according to claim 11 wherein said guide roller has open bearings.

13. The fishing pole according to claim 1 wherein said first rod member is a mirror image of said second rod member.

14. The fishing pole according to claim 8 wherein said swivel guide is pivotally secured to said distal ends of said first and said second rod members, said swivel guide being rotatable in an orthogonal direction with respect to a longitudinal axis of said rod assembly.

15. The fishing pole according to claim 14 wherein said swivel guide includes a first roller and a second roller;
said swivel guide also includes a first side wall and a second side wall, said first roller being secured between said first and said second side walls, said second roller being secured to only said first side wall, said second roller being removable and replaceable by another said second roller having a different size to permit a fishing line having a different dimension to be utilized on said fishing pole.

16. The fishing pole according to claim 15 wherein said swivel guide includes tabs, said tabs being constructed and arranged to maintain a fishing line within said swivel guide.

17. The fishing pole according to claim 1 wherein said fishing pole includes a butt, said butt being secured to said proximal end of said first and said second rod elements, said butt not being moveable with respect to said first and said second rod elements.

18. The fishing pole according to claim 2 wherein said mounting structure includes lower alignment tabs and upper alignment tabs, said proximal ends of said first and said second rod members being secured between said lower and said upper alignment tabs.

19. The fishing pole according to claim 18 including an engagement mechanism, said engagement mechanism removably engaging both said rod members and said mounting structure,
whereby said rod members may be readily removed from and secured to said mounting structure.

20. The fishing rod according to claim 1 wherein said swivel guide maintains said distal ends of said rod members in a spaced apart position between said proximal end of each of said first and said second rod members and said distal ends of said first and said second rod members.

* * * * *